United States Patent
Morgan

(10) Patent No.: US 7,412,690 B2
(45) Date of Patent: Aug. 12, 2008

(54) METHOD, APPARATUS, AND PROGRAM FOR CODE REUSABILITY AND MAINTAINABILITY IN XML-DRIVEN PROJECTS

(75) Inventor: Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/612,457

(22) Filed: Jul. 2, 2003

(65) Prior Publication Data

US 2005/0005276 A1     Jan. 6, 2005

(51) Int. Cl.
G06F 9/44     (2006.01)
G06F 9/45     (2006.01)
G06F 3/00     (2006.01)
G06F 15/00   (2006.01)

(52) U.S. Cl. ............ 717/118; 717/108; 717/137; 719/328; 715/513

(58) Field of Classification Search ........... 717/108, 717/118, 114, 116
See application file for complete search history.

(56) References Cited

U.S. PATENT DOCUMENTS

| | | | |
|---|---|---|---|
| 6,199,195 B1 | 3/2001 | Goodwin et al. | 717/1 |
| 6,385,668 B1 | 5/2002 | Gaddess et al. | 710/8 |
| 6,427,228 B1 | 7/2002 | Wigger | 717/7 |
| 6,993,715 B2 * | 1/2006 | Deen et al. | 715/513 |
| 2002/0073236 A1 * | 6/2002 | Helgeson et al. | 709/246 |
| 2003/0110315 A1 * | 6/2003 | Upton | 709/328 |
| 2004/0015840 A1 * | 1/2004 | Walker | 717/108 |
| 2004/0083233 A1 * | 4/2004 | Willoughby | 707/104.1 |
| 2004/0122690 A1 * | 6/2004 | Willoughby | 705/1 |

* cited by examiner

Primary Examiner—Tuan Q. Dam
Assistant Examiner—Issac T Tecklu
(74) Attorney, Agent, or Firm—Duke W. Yee; David A. Mims, Jr.; Brandon G. Williams

(57) ABSTRACT

A data dictionary is provided that specifies the entities and corresponding attributes for the application program interface developers to use. An extensible markup language interface is provided for customers to perform operations on the data. Application program interfaces receive extensible markup language requests and generate extensible markup language response documents that may return data from the database. A set of classes is also provided that correspond to the entities that are defined in the data dictionary. These classes define utility methods for use in retrieving data. The application program interface then appends the returned response object at the depth necessary in order to generate an extensible markup language document.

22 Claims, 4 Drawing Sheets

METHOD, APPARATUS, AND PROGRAM FOR CODE REUSABILITY AND MAINTAINABILITY IN XML-DRIVEN PROJECTS

BACKGROUND OF THE INVENTION

1. Technical Field

The present invention relates to data processing systems and, in particular, to building application program interfaces for extensible markup language documents.

2. Description of Related Art

Database architectures, such as E-business infrastructures, include large numbers of data entities. These entities may be stored as objects in a data store. The data entities also include large numbers of attributes, which may also be entities. An application program interface (API) may be programmed to access the entities and their attributes.

However, entities may share common attributes. For example, status may be an attribute of several entities, such as customer, user, server, etc. Thus, developers may need to provide code for accessing entities and their attributes redundantly.

Furthermore, the database architecture may change. For example, database column names may change or be removed from previous versions. Therefore, a developer may also need to update the API code for every change in the database architecture. The code must also be changed for each entity being affected.

Therefore, it would be advantageous to provide an improved mechanism for code reusability and maintainability in application program interfaces.

SUMMARY OF THE INVENTION

The present invention provides a data dictionary that specifies the entities and corresponding attributes for the application program interface developers to use. An extensible markup language interface is provided for customers to perform operations on the data. Application program interfaces receive extensible markup language requests and generate extensible markup language response documents that may return data from the database. The present invention also provides a set of classes that correspond to the entities that are defined in the data dictionary. These classes define utility methods for use in retrieving data. The application program interfaces may call these utility methods, passing an identification of an entity and a string representing extensible markup language element name that the caller wants the extensible markup language response object's name to be. The method call may also pass a list of attributes that should be returned. The application program interface then appends the returned response object at the depth necessary in order to generate an extensible markup language document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
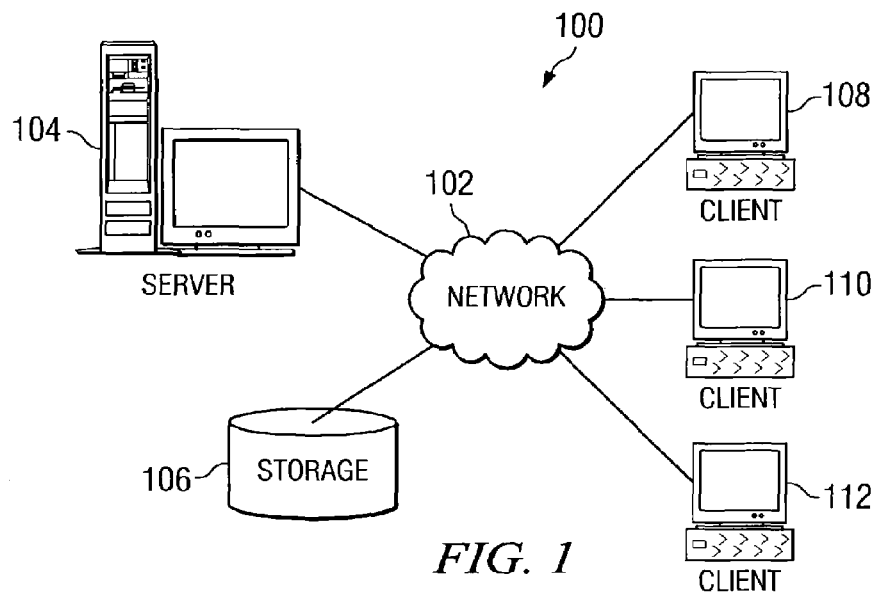
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as E-business infrastructure data to clients 108, 110, 112. Clients 108, 110, and 112 are clients to server 104. Network data processing system 100 may include additional servers, clients, and other devices not shown.

In accordance with a preferred embodiment of the present invention, server 104 provides data and services to clients 108, 110, 112. The clients, such as client 108, may be used by developers to code extensible markup language (XML) requests and application program interface (API) calls In addition, server 104 exposes XML interfaces for clients to access data and services from server 104.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
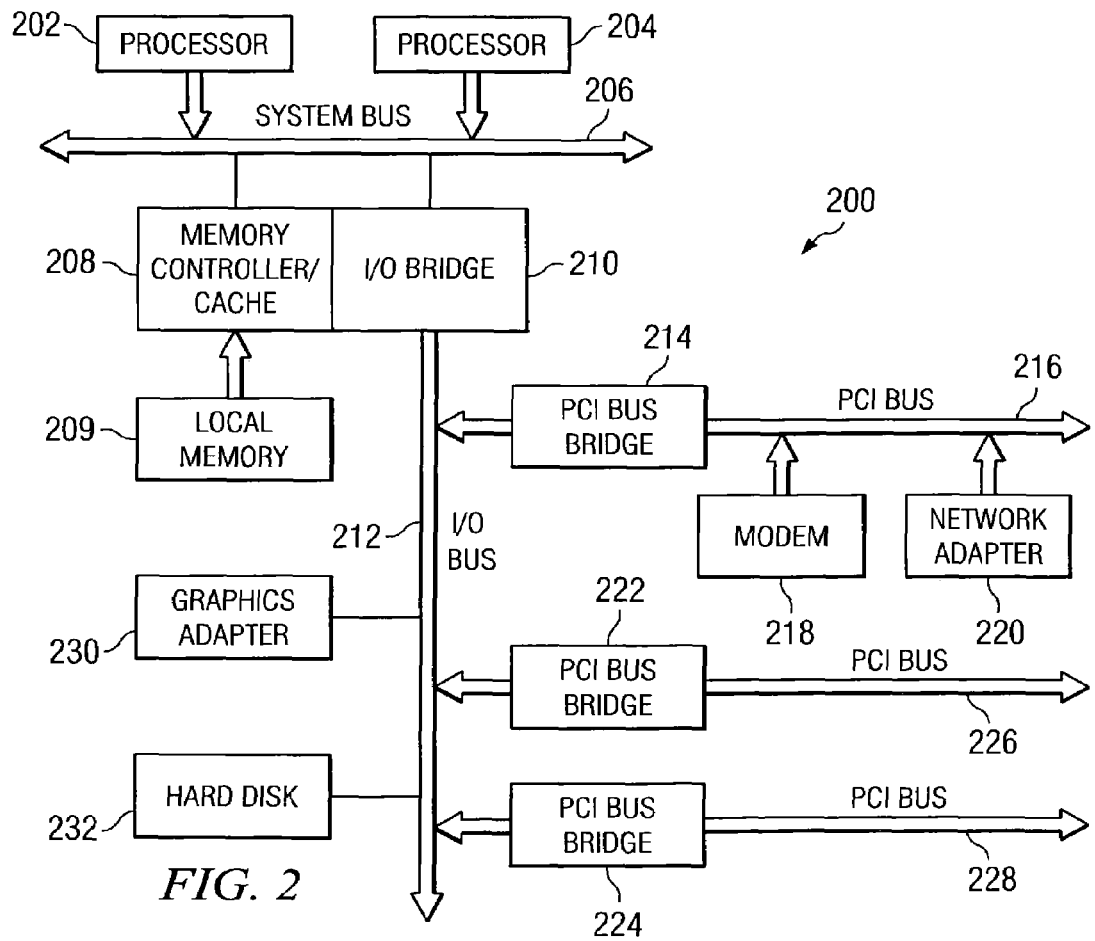
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
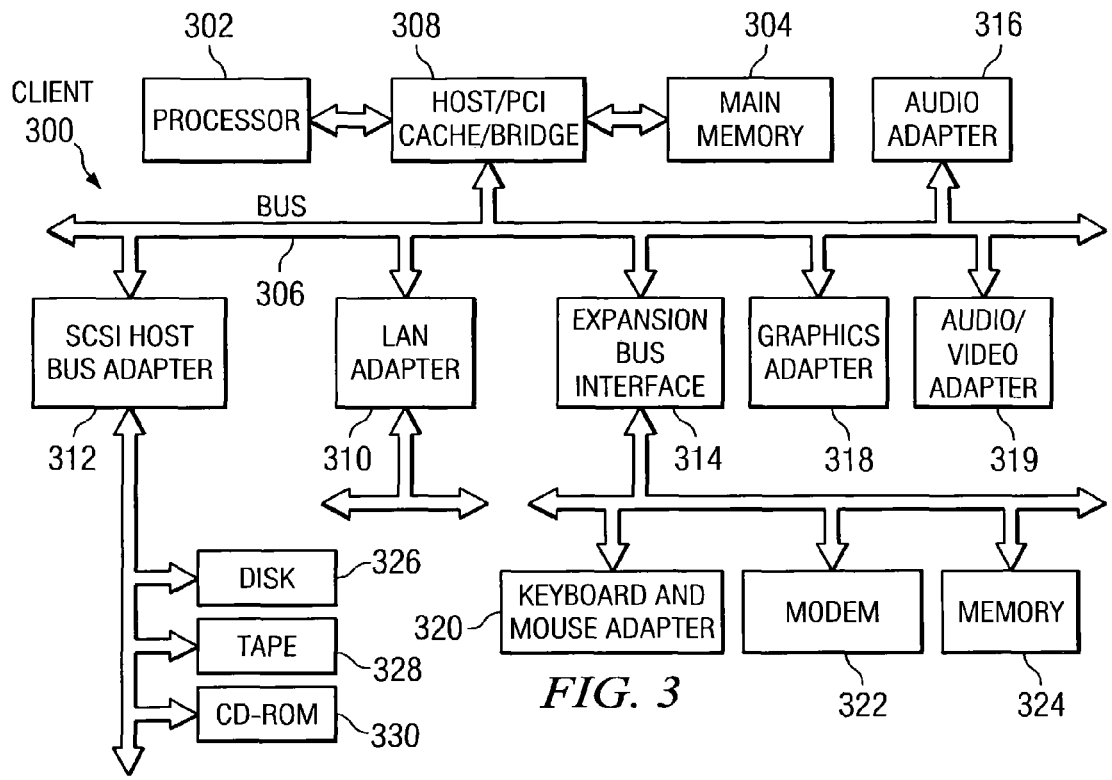
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming language such as Java may run in conjunction with the operating system and provide calls to the operating system from Java programs or applications executing on data processing system 300. "Java" is a trademark of Sun Microsystems, Inc. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
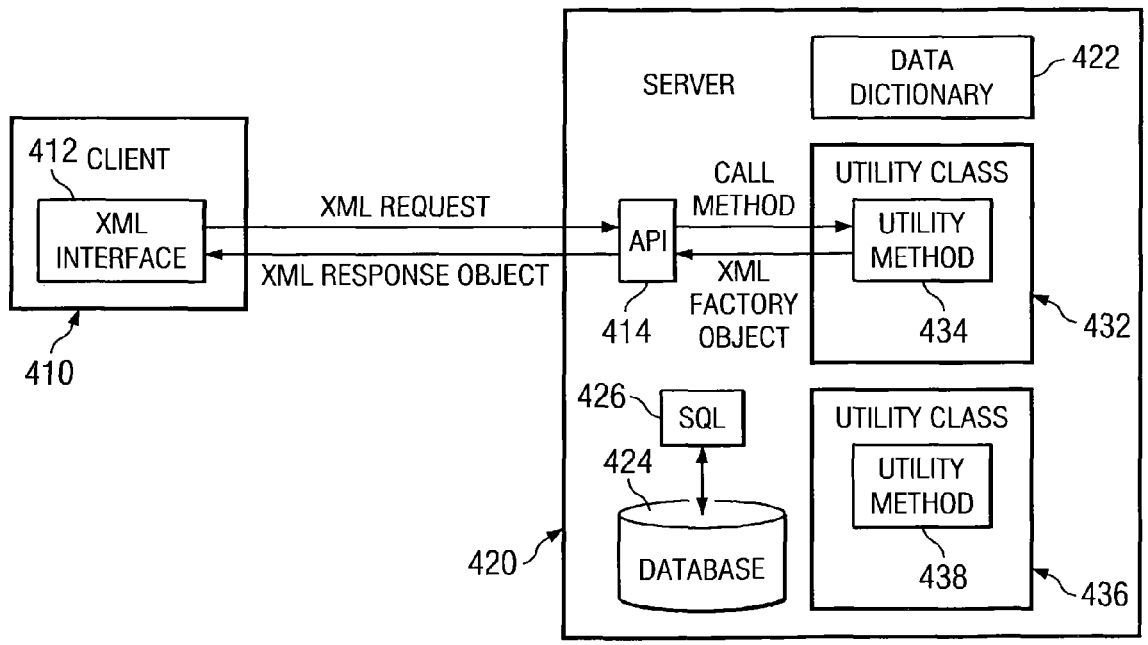
FIG. 4 is a block diagram illustrating a database configuration with an XML interface in accordance with a preferred embodiment of the present invention.

With reference now to FIG. 4, a block diagram illustrating a database configuration with an XML interface is shown in accordance with a preferred embodiment of the present invention. Server 420 provides data and services to client 410. More specifically, client 410 may access database 424 using XML interface 412. API 414 receives XML requests from the client and generates XML response documents that may return data from the database, or notification that an update was successful. The XML requests may include, for example, Lists, Gets, Deletes, Updates, or Adds.

In accordance with a preferred embodiment of the present invention, the architecture team for the configuration develops data dictionary 422, which specifies the entities and corresponding attributes for API 414 to use. The server also includes utility classes that correspond to the entities that are defined in the data dictionary. Each utility class defines utility methods for use in retrieving data. In a Java implementation the utility methods may be, for example, public, static methods. In the example shown in FIG. 4, utility class 432 defines utility method 434 and utility class 436 defines utility method 438.

In the depicted example, API 414 calls utility method 434. The utility method generates and returns a response object. In a preferred embodiment, the response object is an XML document. By returning the response as an object, the schema developers can generate Java classes (with setter and getter methods) that correspond to the elements they define in the schemas. In developing XML responses, the API developers can use these response objects to connect child XML elements to parents. Also, functionality is available that obtains a string representation of the response object to see what the XML actually looks like. The API can then append the response at the depth necessary in order to generate an XML document to return to XML interface 412.

Depending on the API, the XML response might only need to include a subset of data that may be returned. For example, a method call may pass an ArrayList of String objects denoting attributes the client requests to have returned. The server includes structured query language (SQL) interface 426, which receives SQL statements, which may be dynamically generated by utility methods 434, 438. The utility methods may then retrieve data from database 424 using SQL interface 426 and generate the appropriate XML response object to be returned.

Figure 5:
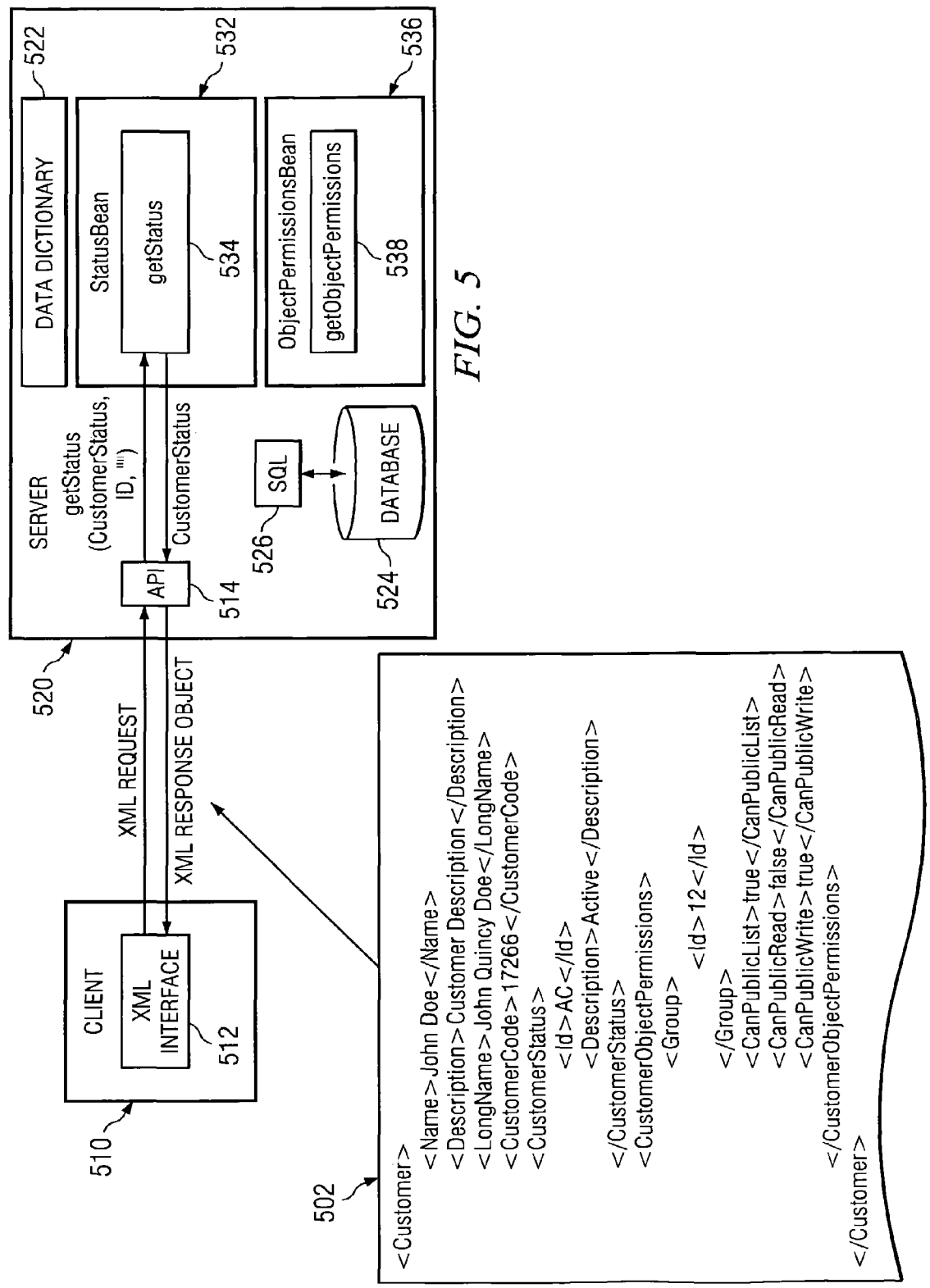
FIG. 5 is an example implementation in accordance with a preferred embodiment of the present invention.

With reference now to FIG. 5, an example implementation is shown in accordance with a preferred embodiment of the present invention. Server 520 provides data and services to client 510. More specifically, client 510 may access database 524 using XML interface 512. API 514 receives XML requests from the client and generates XML response documents that may return data from the database. The XML requests may include, for example, Lists, Gets, Deletes, Updates, or Adds.

Examples of an API may include ListServers, ListUsers, AddCustomer, UpdateSoftwareSpecification, or DeleteServerGroup. The XML response documents may return the data from the database, along with an error code, or simply return the error code, a response description, and a record confirmation, in the case of deletes, updates, or adds.

Data dictionary 522 specifies the entities and corresponding attributes for API 514 to use. Examples of entities may include Customer, User, IPAddress, Storage Allocation, ObjectPermissions, Status, etc. Examples of the attributes of Customer may include its ID, which is of type Integer; its Name, LongName, and Description, which are of type String; its CustomerObjectPermissions, which is of type ObjectPermisssions (a defined entity); and its CustomerStatus, which is of type Status (a defined entity). An example of an XML response that the client wishes to have returned is shown as 502.

A first utility class, StatusBean 532, defines a utility method, getStatus() 534. A second utility class, ObjectPermissionsBean 536, defines a utility method, getObjectPermisssions() 538. The StatusBean class is only concerned only with retrieving information about the Status entity. As a result, in its getStatus() method, it takes a status ID (the ID of the entity) and a String representing the XML element name that the caller of the class wants the XML response object's name to be. The getStatus() method takes the XML element name, because although multiple entities may make use of one utility class, they may want to have different names for it in the generated XML response. For example, the Customer entity may call its Status entity "Customer Status," the User entity may call it "UserStatus," and the IPAddress entity may simply call it "Status."

In the depicted example, API 514 calls getStatus()534 and passes the entity ID, the response object name, "CustomerStatus," and an empty list of attributes. An empty list of attributes causes the utility method to return every possible attribute for the entity. The utility method, getStatus(), generates and returns an XML response object, CustomerStatus. The getStatus()method may obtain the appropriate attributes for the Customer entity using SQL interface 526. The API then appends the returned factory object at the appropriate depth so that XML response 502 is generated correctly. For example, in the example XML response shown as 502, the API appends the CustomerObjectPermissions entity after the CustomerStatus entity.

Depending on the API, the XML response might only need to include a subset of data that may be returned. For example, the method call may pass an ArrayList of String objects denoting attributes, such as "ID" for only the ID of the Status entity. In this example, the getStatus() method generates a SQL statement to retrieve the ID attribute for the Status entity from database 524 using SQL interface 526. The getstatus() method would then generate the appropriate XML response object to be returned.

Figure 6:
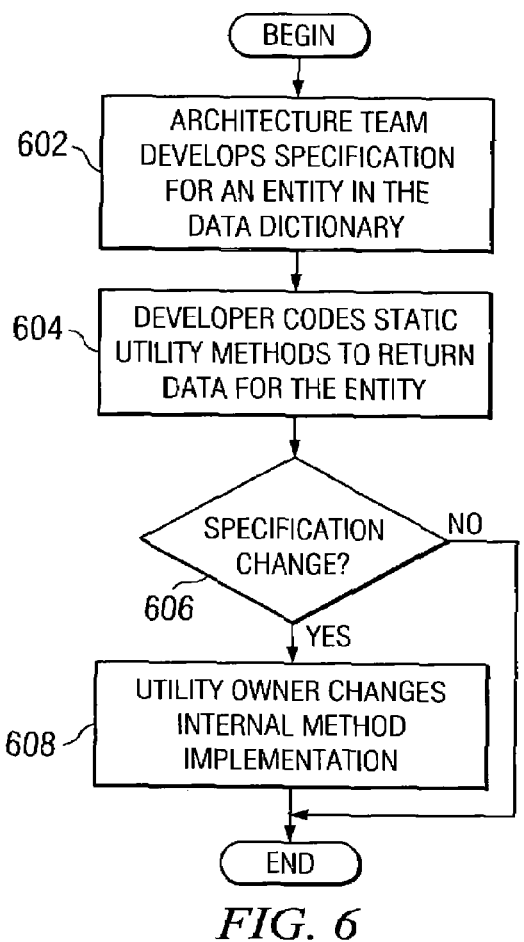
FIG. 6 is a flowchart illustrating the maintenance of an entity in a database infrastructure in accordance with a preferred embodiment of the present invention.

FIG. 6 is a flowchart illustrating the maintenance of an entity in a database infrastructure in accordance with a preferred embodiment of the present invention. The process begins and the architecture team develops a specification for an entity in the data dictionary (step 602). The developer codes static utility methods to return data for the entity (step 604).

A determination is made as to whether the specification has changed for the entity (step 606). If the specification for the entity has not changed, the process ends. If, however, the specification for the entity has changed in step 606, the utility owner changes the internal method implementation (step 608) and the process ends. Having the entity encapsulated as a class with an associated utility method allows the developer to only have to change the utility, rather than all the APIs that use the entity.

Figure 7:
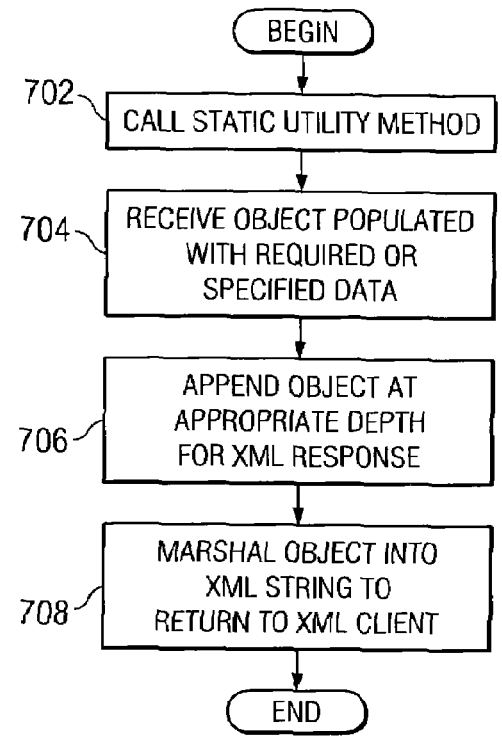
FIG. 7 is a flowchart illustrating the operation of an application program interface in accordance with a preferred embodiment of the present invention.

With reference now to FIG. 7, a flowchart illustrating the operation of an application program interface is shown in accordance with a preferred embodiment of the present invention. The process begins when an XML request is received. Responsive to the request, the application program interface calls a static utility method (step 702) and receives a response object populated with the required or specified data for an entity (step 704). The application program interface then appends the object at the appropriate depth for the XML response (step 706). Then, the application program interface marshals the object into an XML string to return to the XML client (step 708) and the process ends.

Figure 8:
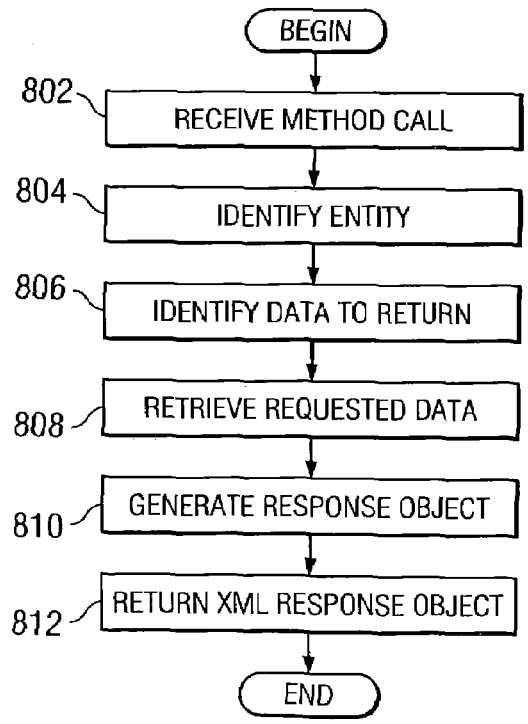
FIG. 8 is a flowchart illustrating the operation of a utility method in accordance with a preferred embodiment of the present invention.

Turning now to FIG. 8, a flowchart illustrating the operation of a utility method is shown in accordance with a preferred embodiment of the present invention. The process begins and receives a method call (step 802). The utility method identifies an entity (step 804) and identifies data to return (step 806). Then, the utility method receives the requested data (step 808) and generates the XML response object (step 810). Thereafter, the utility method returns the XML response object (step 812) and the process ends.

Thus, the present invention solves the disadvantages of the prior art by providing a set of classes that define utility methods for use in retrieving data. Application program interfaces may call these utility methods, passing an identification of an entity and a string representing extensible markup language element name that the caller wants the extensible markup language response object's name to be and also passing a list of the attributes or an empty string for all attributes for the entity. When a change is made to an entity, only the code in the utility methods must be updated, rather than in every area that the entity is used. This greatly improves the productivity of developers. Another advantage is the flexibility that this approach offers. The attributes returned by a utility method may be determined by the identified entity or by the application program interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, for code reusability and maintainability, the method comprising:
   providing a utility class in a server, wherein the utility class defines a utility method, the utility method being written in an object oriented programming language;
   receiving a markup language request at the server for an entity from a client, the markup language request including a response object name, wherein the response object name is a string representing a desired element name for a markup language response object;
   responsive to receiving the markup language request at the server for the entity from the client, generating a method call for the utility method, wherein the method call identifies the entity and the response object name;
   generating the markup language response object and assigning the response object name to the markup language response object; and
   returning the markup language response object named as the response object name to the client.

2. The method of claim 1, wherein the markup language request is an extensible markup language request.

3. The method of claim 2, wherein the extensible markup language request is one of a list request and a get request.

4. The method of claim 1, farther comprising:
   retrieving, by the utility method, at least one data item for the method call and the entity,
   wherein the markup language response object includes the at least one data item.

5. The method of claim 4, wherein the step of retrieving at least one data item includes retrieving the at least one data item from a database.

6. The method of claim 5, wherein the at least one data item is retrieved from the database through a structured query language interface.

7. The method of claim 4, wherein the markup language request includes a list of attributes.

8. The method of claim 7, wherein the at least one data item includes a set of attributes for the entity, wherein the set of attributes corresponds to the list of attributes.

9. The method of claim 8, wherein the list of attributes is an empty string.

10. The method of claim 9, wherein the set of attributes includes all attributes for the entity.

11. The method of claim 1, wherein the markup language response object is an extensible markup language document.

12. The method of claim 1, wherein the sewer is located at a first computer system, wherein the client is located at a second computer system, and wherein the first computer system is separate from the second computer system.

13. A data processing system for code reusability and maintainability, the data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to:
   provide a utility class, wherein the utility class defines a utility method, the utility method being written in an object oriented programming language;
   receive a markup language request at the server for an entity from a client, the markup language request including a response object name, wherein the response object name is a string representing a desired element name for a markup language response object;
   responsive to receiving the markup language request for attributes for the entity from the client, generate a method call for the utility method, wherein the method call identifies the entity and the response object name;
   generate the markup language response object and assigns assign the response object name to the markup language response object; and
   return the markup language response object named as the response object name to the client.

14. The data processing system of claim 13, wherein the client includes an extensible markup language interface and wherein the markup language request is an extensible markup language request.

15. The data processing system of claim 13, wherein the utility method retrieves at least one data item for the method call and the entity and wherein the markup language response object include the at least one data item.

16. The data processing system of claim 15, wherein the utility method retrieves the at least one data item from a database.

17. The data processing system of claim 15, wherein the markup language request includes a list of attributes.

18. The data processing system of claim 17, wherein the at least one data item includes a set of attributes for the entity, wherein the set of attributes corresponds to the list of attributes.

19. The data processing system of claim 18, wherein the list of attributes is an empty string.

20. The data processing system of claim 19, wherein the set of attributes includes all attributes for the entity.

21. The data processing system of claim 13, wherein the markup language response object is an extensible markup language document.

22. A computer program product, in a computer readable physical storage medium, for code reusability and maintainability, the computer program product comprising:
   instructions, in a utility class, for defining a utility method, the utility method being written in an object oriented programming language;
   instructions for receiving a markup language request at the server for an entity from a client, the markup language request including a response object name, wherein the response object name is a string representing a desired element name for a markup language response object;
   instructions, responsive to receiving the markup language request at the server for attributes for the entity from the client, for generating a method call for the utility method, wherein the method call identifies the entity and the response object name;
   instructions for generating the markup language response object and assigning the response object name to the markup language response object; and
   instructions for returning the markup language response object named as the response object name to the client.

* * * * *